June 7, 1960  G. W. ROACH ET AL  2,939,569
COTTON WEIGHING MACHINE
Filed Oct. 16, 1957  4 Sheets-Sheet 1
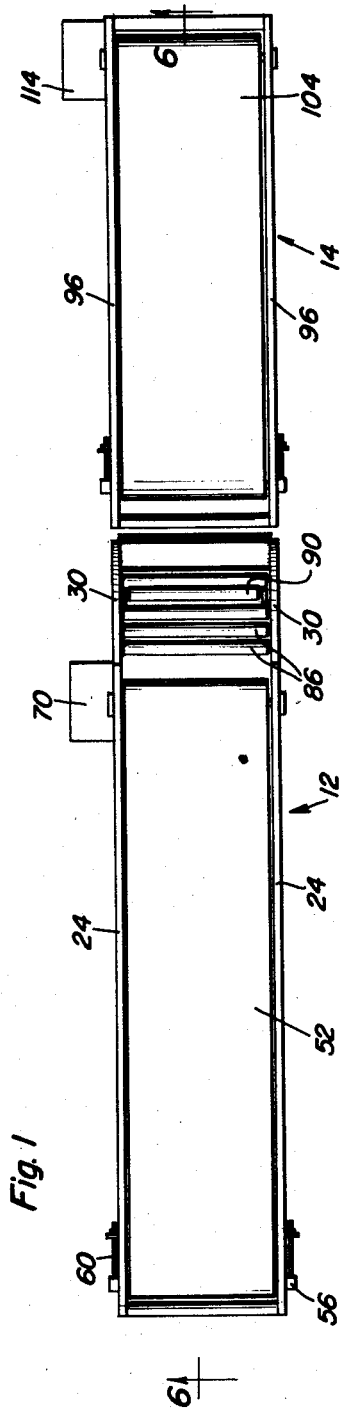
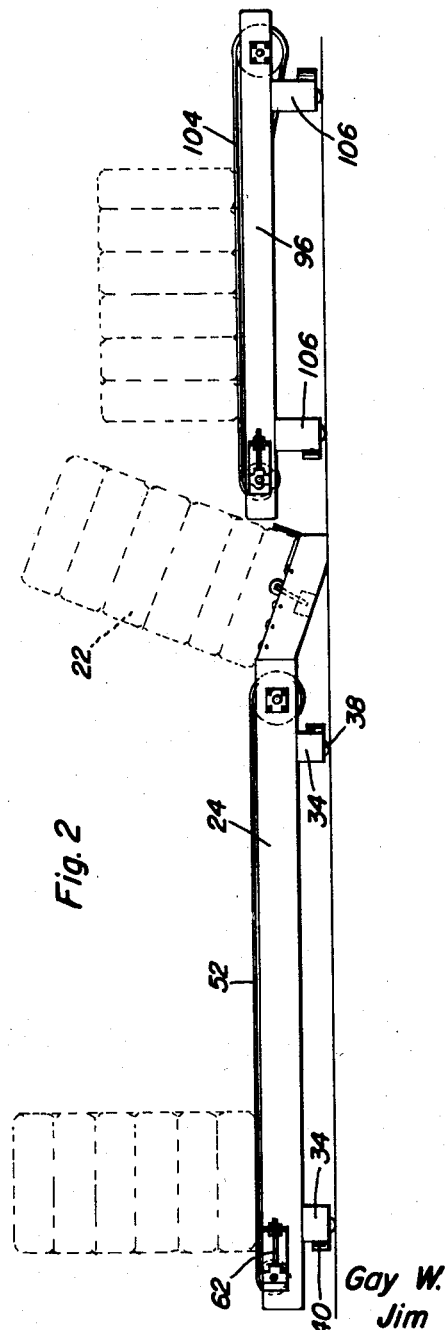
Gay W. Roach
Jim M. Clark
INVENTORS June 7, 1960   G. W. ROACH ET AL   2,939,569
COTTON WEIGHING MACHINE
Filed Oct. 16, 1957   4 Sheets-Sheet 2
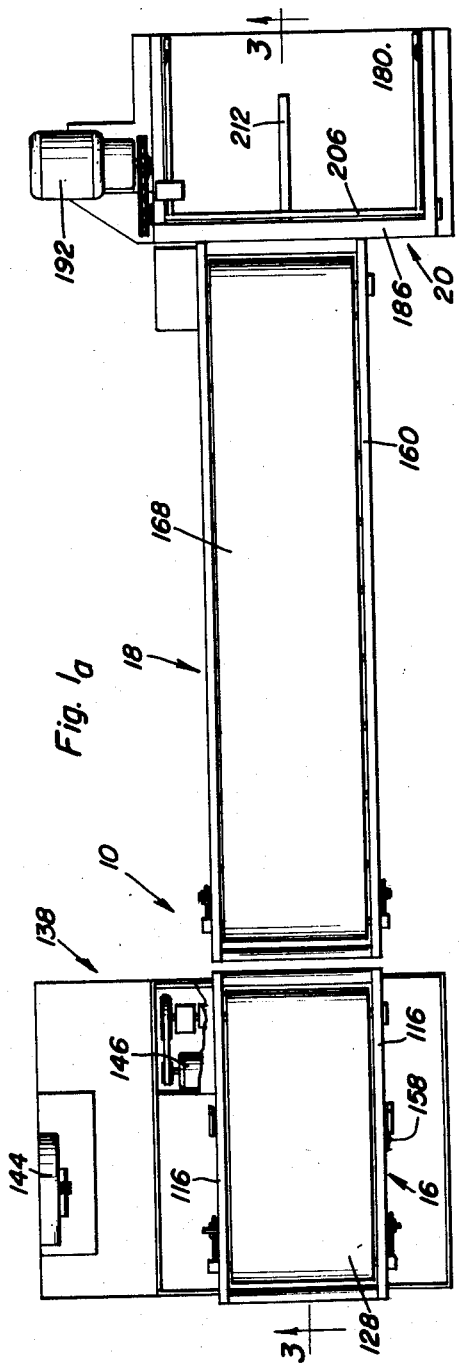
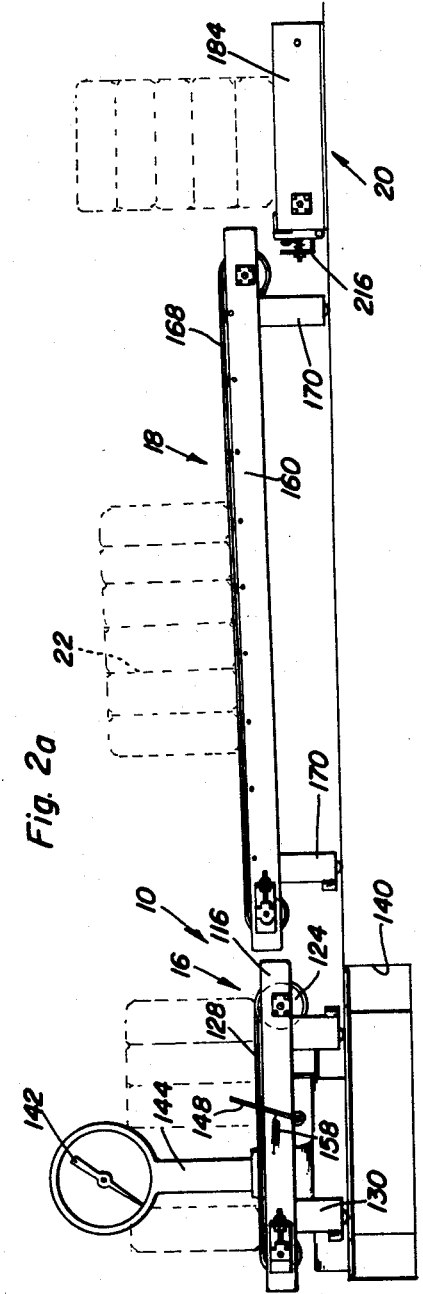
Gay W. Roach
Jim M. Clark   INVENTORS

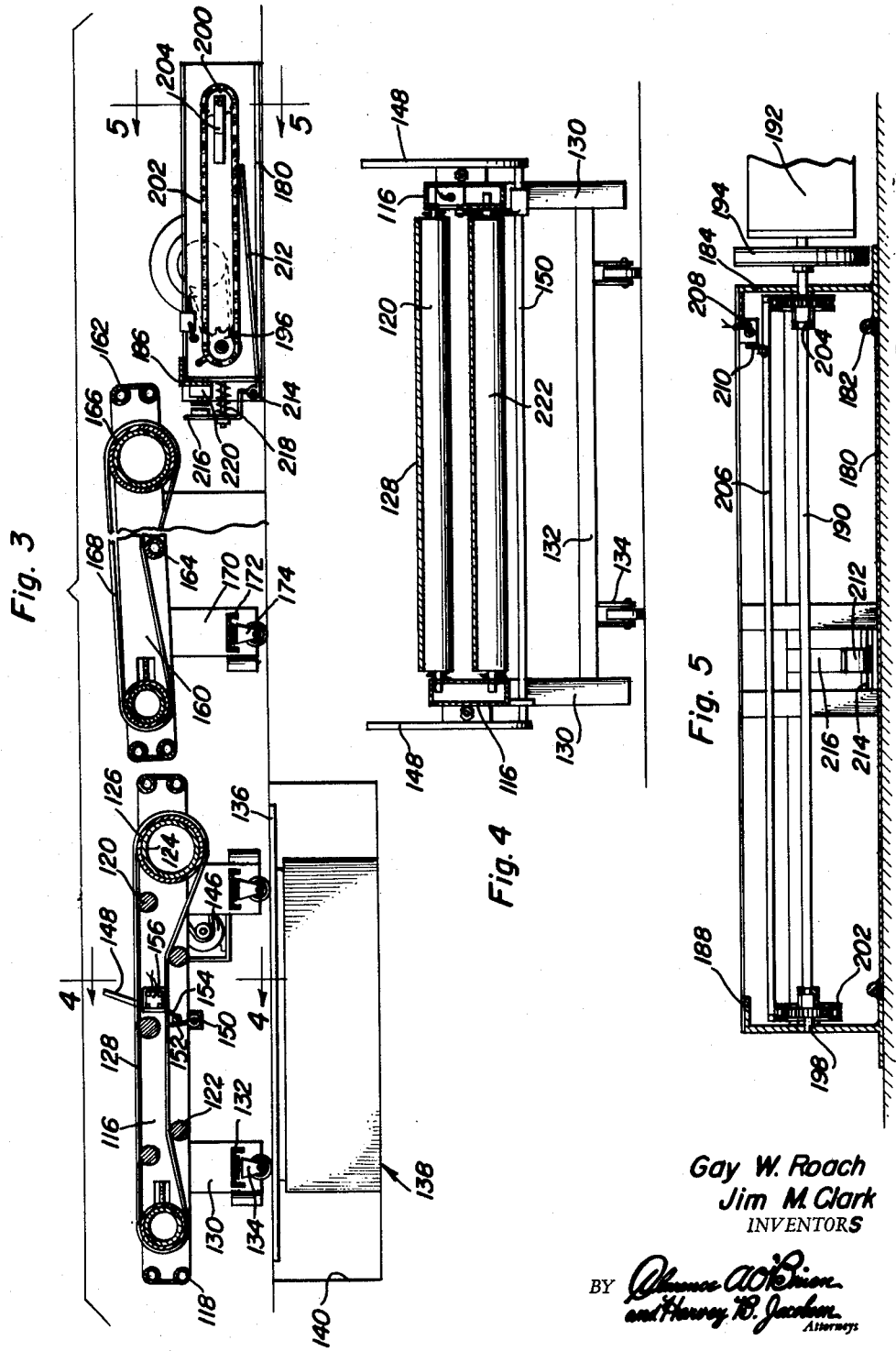

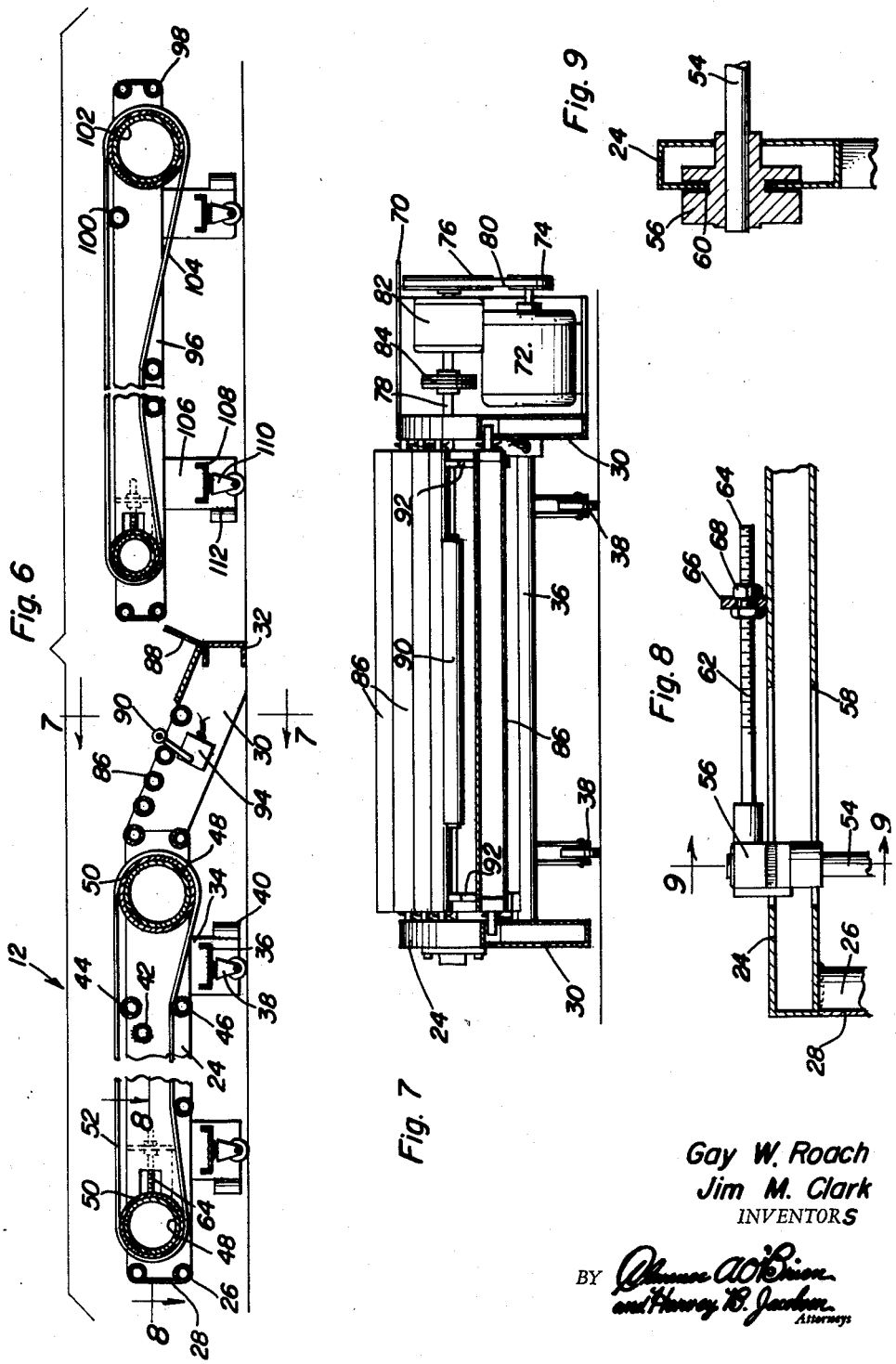

ated June 7, 1960

2,939,569
COTTON WEIGHING MACHINE

Gay W. Roach and Jim M. Clark, both of General Delivery, Truman, Ark.

Filed Oct. 16, 1957, Ser. No. 690,464

5 Claims. (Cl. 198—37)

The present invention generally relates to a weighing machine and more particularly to a weighing machine having incorporated therewith conveyor assemblies for handling bales of cotton for facilitating the tagging, weighing and sampling of each bale of cotton for rendering the bale handling procedure more efficient, less time consuming and reducing the number of persons required in handling cotton bales.

Each bale of cotton arriving from a cotton gin is tagged, weighed and sampled on arrival at the compress from the gin before it is compressed to final form. Due to the bulkiness and weight of these bales, it is usual to provide manually operated trucks for carrying the individual bales of cotton to a weighing station for weighing, sampling as well as tagging after which the manually operated trucks are used to carry the bale to a desired delivery point such as the compress for compressing the bale to final form. This required a lot of employees and was time consuming and highly inefficient. Generally, approximately 14 men were employed as a weighing crew with approximately half of these men operating the manual trucks for trucking the bales of cotton through the weighing and sampling operation. In order to cut the cost of the weighing and sampling operation, we have provided a machine upon which the bales of cotton may be deposited with the machine then conveying the individual bales of cotton to a weighing machine with the bales being automatically stopped on the machine for facilitating the weighing thereof and after the weight of the bales has been noted, the bale will be conveyed from the weighing portion of the machine for purposes of taking a sample of the particular bale after which it is discharged at a desired point of delivery.

An important object of the present invention is to provide a cotton bale weighing machine which is simple in construction, efficient in operation, easy to use, constructed of long lasting components and relatively inexpensive to manufacture and maintain.

Another important feature of the present invention is to provide an arrangement of conveyors incorporated with a pair of scales and a control mechanism for rendering the handling of the cotton bales substantially fully automatic except for the removal of the bale from the scales which is accomplished by the operator who notes the weight of each bale.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1 and 1a are a top plan view of the cotton weighing machine of the present invention;

Figures 2 and 2a are a side elevational view of the machine shown in Figures 1 and 1a;

Figure 3 is a longitudinal sectional view taken substantially upon a plane passing along section line 3—3 of Figure 1a illustrating the construction of the scales and conveyor thereon together with the discharge conveyor assemblies;

Figure 4 is a transverse sectional view taken substantially upon a plane passing along section line 4—4 of Figure 3 illustrating further structural details of the scales and the conveyor mounted thereon;

Figure 5 is a detailed sectional view taken substantially upon a plane passing along section line 5—5 of Figure 3 illustrating structural details of the pusher assembly forming a part of the discharge conveyor system for the machine of the present invention;

Figure 6 is a longitudinal, vertical sectional view taken substantially upon a plane passing along section line 6—6 of Figure 1 illustrating the details of construction of the loading conveyor and feed conveyor for the scales;

Figure 7 is a transverse sectional view taken substantially upon a plane passing along section line 7—7 of Figure 6 illustrating the construction of the inclined portion of the loading conveyor and the construction of the switch actuator mounted thereon;

Figure 8 is a detailed sectional view taken substantially upon a plane passing along section line 8—8 of Figure 6 illustrating the construction of the take-up mechanism for the conveyor belt; and Figure 9 is a detailed sectional view taken substantially upon a plane passing along section line 9—9 of Figure 8 illustrating further structural details of the take-up mechanism.

Referring now to Figures 1, 1a, 2 and 2a, the numeral 10 generally designates the bottom bale weighing and handling machine of the present invention which incorporates a loading conveyor designated generally by the numeral 12, a tagging conveyor generally designated by the numeral 14, a scale conveyor 16, a sampling conveyor generally designated by the numeral 18 and a removal assembly generally designated by the numeral 20. All of these elements are arranged in longitudinally aligned relation generally coextensive with each other for providing a flow path for a series of bales of cotton designated by the numeral 22.

Briefly, the bales are loaded onto the loading conveyor 12 and are finally discharged by the removal assembly with the bales 22 being initially positioned on end and deposited on the removal assembly on end with the bales 24 lying on their sides during movement along the tagging conveyor 14, weighing conveyor 16 and sampling conveyor 18. While the dimensions of the assembly are variable, it has been found that an overall length of 48 feet is satisfactory with the loading conveyor generally being 14 feet long, the tagging conveyor 10 feet long, the scale conveyor 6 feet long, the sampling conveyor 14 feet long and the removal assembly 4 feet long. The transverse width of the assembly will also be variable but it has been found that a 30 inch wide belting employed on the conveyors is satisfactory. Each of the conveyors is provided with power drive means as is the removal assembly and each is provided with take-up mechanism for maintaining the belting in taut condition.

Referring now specifically to Figure 6 of the drawings, the details of the loading conveyor 12 are illustrated and includes a pair of longitudinal frame rails 26 which may be hollow box rails having a relatively long vertical depth and a relatively narrow width. The ends of the longitudinal side rails 24 are interconnected by transverse tubular members 26 with the end of the loading conveyor 12 remote from the tagging conveyor 14 having a transverse end plate 28 connected to the transverse tubular members 26. Extending downwardly in inclined relation to one end of each of the side rails 24 is an inclined rail 30 with the ends of the inclined rails 30 being interconnected by a transversely extending channel-shaped member 32 resting upon a supporting surface. Also, the longitudinal rails 24 are provided with depending brackets 34 with there being provided at least two pair of depending brackets with the brackets 34 being interconnected by a transverse channel-shaped member 36. The channel-shaped members 36 are in longitudinally spaced relation and each channel-shaped member 36 supports a caster wheel 38. Provided on each bracket 34 is a tubular sleeve 40 through which a fastener may be inserted for insertion into the supporting surface for anchoring the loading conveyor 12 rigidly in position. Rigidly interconnecting the longitudinal frame members 24 is a plurality of transverse pipe braces 42 and also provided adjacent the upper edge of the longitudinal rail members 24 is a plurality of longitudinally spaced rollers 44 which are journaled in the rail members 24. Also provided at the lower edge of the rail members 24 is a plurality of transverse rollers 46. At each end of the longitudinal rails 24 is mounted an enlarged end roller 48 which is covered with rubber 50 for receiving an endless conveyor belt 52.

One of the rollers 48 is longitudinally adjustably mounted on the side rails 24 and includes a shaft 54 received in a bearing member 56 which is slidably received in a pair of elongated slots 58 in the spaced walls of the hollow box frame side rail 24. The bearing member 56 is provided with upper and lower grooves 60 slidably receiving the edges of the slot 58 in the outer wall of the side rail 24 thus precluding lateral shifting of the longitudinally adjustable roller 48 and providing a guide for the longitudinal movement thereof. Extending alongside the longitudinal rail 24 and rigid with the bearing member 56 is an elongated rod 62 having a threaded portion 64 extending through a laterally extending lug 66 rigid with the side rail 24. A pair of nuts 68 are threaded onto the screw threaded portion 64 of the rod 62 and are in engagement with opposite faces of the lug 66 whereby the nuts 68 may be selectively loosened and tightened for shifting the shaft 54 and the roller 48 longitudinally of the side rails 24. A take-up mechanism is provided on each side rails 24 for moving both ends of the roller 48 an equal amount for maintaining the proper tension on the conveyor belt which may be of any suitable construction. The rollers 44 at the top of the frame rails 24 may be spaced on 8 inch centers for providing substantially a continuous support for the conveyor belt 52.

Mounted on one of the frame rails 24 is a housing 70 having an electric motor 72 disposed therein and provided with a drive pulley 74 in alignment with a driven pulley 76 connected to a shaft extension 78 with the pulleys 74 and 76 being interconnected by a V-belt. The shaft extension 78 is connected to a roller 48 for driving the loading conveyor. A reduction gear box assembly 82 may be provided in the shaft extension 78 as may be provided a slip clutch 84 for preventing damage to the conveyor in the event it becomes jammed.

Disposed between the downwardly inclined side rails 30 is a plurality of freely rotatable rollers 86 which define a downwardly inclined path whereby bales of cotton 22 will roll down this incline after they have been discharged from the conveyor belt 52. Disposed at the lower end of the upper edge of the rails 30 is a stop wall or ledge 88 for limiting the downward movement of the cotton bales and causing them to tip over away from the loading conveyor 12. As the cotton bale progresses down the incline defined by the rollers 86, it engages a roller 90 interconnecting a pair of pivotal arms 92 with one of the arms 92 being connected to a switch 94 which control operation of the motor 72. The switch 94 will stop the motor 72 thus stopping the loading conveyor 12 when a cotton bale 22 is positioned on the rollers 86 in the position illustrated in phantom in Figure 2. As long as the cotton bale 22 is in this position, the loading conveyor 12 will not be operated. As soon as the bale 22 moves on to the tagging conveyor 14, the loading conveyor will again operate to move the next following bale of cotton into the position illustrated by the bale of cotton 22 resting on the rollers 86. A manual switch may also be provided for opening and closing a circuit to the motor 72 and the control switch 94 whereby the entire loading conveyor may be rendered inoperative or operative as desired with the switch 94 providing the control therefor during use of the device.

All of the rollers are preferably of tubular construction and are supported in ball bearings thus providing ease of movement of the cotton bales. The top surface of the conveyor may conveniently be located approximately one foot above the supporting surface. Also, the take-up detail and structural arrangement of the other conveyors are substantially equivalent in that they all use box frame side rails, tubular rollers supported in ball bearings, caster wheels, and the same take-up mechanism for the end rollers for the conveyor belt.

Figure 6 also illustrates the details of the tagging conveyor 14 which includes the side rails 96 interconnected by braces 89 and upper and lower rollers 100 and rubber covered end rollers 102 having an endless flexible conveyor belt 104 encircling the same together with the same take-up mechanism as employed in conjunction with the loading conveyor 12. The supporting mechanism is the same in that it includes depending brackets 106 with transversely extending channel-shaped members 108 having a pair of supporting casters 110 thereon and tubular sleeves 112 for receiving anchoring fasteners if desired. A housing 114 is mounted on one of the side rails 96 for enclosing an electric motor and power device similar to the electric motor for powering the loading conveyor 12 with there also being provided a manual switch for stopping and starting the tagging conveyor. The cotton bales 22 are received from the loading conveyor since the cotton bale will tilt and roll down the incline of the loading conveyor onto the tagging conveyor. The operator then tags the bales and starts the tagging conveyor 14 and also simultaneously starts the scale conveyor 16 and sampling conveyor 18.

The scale conveyor 16 includes generally the same conveyor construction including side rails 116 interconnected by rigid end braces 118 and provided with a plurality of mutually spaced rollers 120 along the top edge thereof and rollers 122 along the bottom edge thereof together with two enlarged hollow rollers 124 with one of the rollers being adjacent one end of the conveyor 16 and the other of the rollers 124 being at the other end thereof and each being provided with a rubber cover or covering 126 with an endless conveyor belt 128 encircling the rollers 124. Supporting brackets or legs 130 are provided with the legs being interconnected by transverse channel-shaped members 132 each of which supports a pair of caster wheels 134. Instead of the caster wheels 134 resting on a supporting surface, they rest upon the load receiving platform 136 of a pair of scales generally designated by the numeral 138 located in a recess or pit 140 in the supporting surface. The scales 138 are provided with an indicating pointer 142 disposed at the upper end of an upstanding housing 144 at one end of the scales 138 for indicating the weight of the bale of cotton deposited on the scale conveyor 16.

The roller 124 at the end of the scale conveyor 16 remote from the tagging conveyor 14 is provided with a drive motor 146 generally similar to the drive motor for the other conveyors and the drive motor 146 is also provided with a reduction gear arrangement and the belt drive. Disposed in the path of movement of the bale of cotton as it is moved onto and fully received on the scale conveyor 16 is a pair of stop bars or arms 148 connected to a transverse rod 150 journaled in suitable bearings on the side rails 116 with the rod 150 having an arm 152 engageable with the actuating lever 154 of a control switch 156 for the drive motor whereby a cotton bale which moves onto the scale conveyor 16 will depress one of the stop bars 148 thus stopping the motor. After the bale has been weighed, the operator may push a manual starting button which overcomes the switch 156 for operating the motor and causing the bale of cotton to move off of the scale conveyor 16. The cotton bale then moves on due to manual depression of a switch for energizing the drive motor until the stop bars are free of the bale. When this occurs, return springs 158 will return the stop bars 148 to a normal position for engagement by the next succeeding bale of cotton. The weighed bale of cotton then moves onto the sampling conveyor which is generally designated by the numeral 18 and having substantially the same structural details including side rails 160, end braces 162, top and bottom small rollers 164, enlarged end rollers 166, an endless belt 168 and slack take-up mechanism together with a motor for powering the same. The side rails 160 are provided with depending supporting legs 170 interconnected by transverse members 172 having caster wheel assemblies 174 thereon. The sampling conveyor 18 has the end thereof remote from the scale conveyor 16 elevated slightly above the end thereof adjacent the scale conveyor whereby the cotton bale will be slightly elevated for depositing the bale onto the removal assembly generally designated by the numeral 20. After the bale has been moved from the scale conveyor to the sampling conveyor, the next succeeding bale will stop the tagging conveyor, scale conveyor and sampling conveyor by depressing the stop bars which controls conveyors 14, 16 and 18. The operator weighs the succeeding bale, that is the one which has just stopped the three conveyors, then samples the preceding bale, that is, the one that has just left the scale conveyor and is deposited on the sample conveyor and then starts the conveyors 14, 16 and 18 by depressing a control button. The cotton bale then continues on the sample conveyor 18 and drops off onto the removal assembly 20. Thus, the operator who weighs and samples the bales of cotton controls operation of conveyors 14, 16 and 18 as far as starting these conveyors is concerned with the stopping of these conveyors being responsive to the presence of a bale of cotton on the scale conveyor. Of course, if it is the last bale of cotton, the operator may sample the bale while it is still on the scale conveyor or may stop the conveyors by a manual operation of the previously mentioned manual switch. Operation of the loading conveyor is dependent upon the presence or absence of a bale of cotton on the inclined ramp or by a manual switch which may be used to deenergize or energize the loading conveyor.

The removal assembly is disposed below the end of the sampling conveyor 18 and includes a bottom or slide plate 180 which is provided with skid rods or pipes 182 on the upper surface thereof. Upstanding side walls 184 are provided on the plate 180 and these side walls 184 are interconnected at the forward end by a transverse brace 186 and are provided with inturned longitudinal flanges 188. Adjacent the end of the plates 180 nearest the discharge end of the sampling conveyor 18 is a transverse driven shaft 190 which extends outwardly beyond one of the side plates 184 and is connected to a drive motor 192 by virtue of a belt or chain drive designated by the numeral 194 and the drive assembly may also be provided with a reduction gear unit for driving the shaft 190.

The shaft 190 is provided with a sprocket gear 196 adjacent each end thereof with the sprocket gears generally underlying the flanges 188. Disposed adjacent the opposite end of each side plate 184 is a stub shaft or axle 198 having a sprocket gear 200 mounted thereon. An endless sprocket chain 202 encircles the aligned pairs of sprocket gears 196 and 200 respectively and generally underlies the flanges 188. The inner end of the stub shaft or axles 198 are provided with a bearing connection in a bracket 204 which extends inwardly and is attached to the respective side walls 184 inwardly of the sprocket gear 200 which also serves to protect the sprocket gear 200 from becoming entangled with the bale of cotton.

The two sprocket chains 202 are interconnected by a transverse pusher bar 206 which will engage a bale of cotton and push it outwardly along the top surface of the slide plate 180 without tipping or tilting the bale of cotton over thus discharging the bales of cotton from the removable assembly with the bales of cotton being disposed on end. A control switch 208 for the motor 192 is provided with a control arm 210 in the path of movement of the pusher bar 206 whereby the pusher bar will stop the motor 192 after it has pushed a bale of cotton from the slide pate 180 and returned to a normal position generally adjacent the transverse brace 186.

An elongated starter bar 212 is provided adjacent the slide plate 180 and is pivotally supported on a pivot shaft 214 and is provided with an upstanding end portion 216 which is spring biased by a spring 218 for urging the starter bar 212 to extend rearwardly and upwardly from the slide plate 180 whereby a bale of cotton deposited on the removal assembly 20 will have the end thereof engaged with the starter bar 212 which will depress the starter bar 212, compress the spring 218 and move the arm 216 into contact with the actuating arm of a starter switch which may be in the form of a palm switch or push-button switch designated by the numeral 220 for energizing the motor and starting the removal assembly and causing the sprocket chain 202 to bring the pusher bar 206 into registry with a bale of cotton for pushing the bale of cotton off the slide plate. In the sequence of operation, the cotton bale drops on the starter bar and the gear motor starts driving the roller chain. The pull bar or pusher bar engages the bale pulling it along slide plate until the bale is pushed off the slide plate. The pusher or pull bar will continue around until it strikes the roller arm switch 208 for shutting off the motor.

Briefly, the sequence of operation involves the loading of one or more bales of cotton on the end of loading conveyor 12, with the bales standing on ends. Assuming that everything is stopped, the operator may then start loading conveyor 12. The bale then proceeds to the end of conveyor 12, tilts and rolls down incline on rollers 86 until it hits the stop roller 90 and the stop plate 88. The bale will then tilt or fall over onto the tagging conveyor 14 and if the tagging conveyor is in operation, the bale will be completely received on the tagging conveyor thus releasing the stop roller 90 thus providing automatic operation of the loading conveyor 12. If the tagging conveyor is not in operation, the operator may tag the initial bale of cotton since the tagging conveyor would not then be in operation. After he has tagged the initial bale of cotton, he may operate a manual switch which operates conveyors 14, 16 and 18. The initial bale is conveyed onto the scale conveyor 16 or it hits the stop bar thus shutting off the conveyors 14, 16 and 18. The operator then weighs the bale, records the weight and will then start conveyors 14, 16 and 18 by a manual switch. When the initial bale reaches the sampling conveyor 18, a subsequent or second bale will stop the conveyors 14, 16 and 18 by striking the stop bars on the scale conveyor 16. The operator then may weigh the second bale and sample the first bale at the same time a third bale is being tagged thus permitting the operator to then start the conveyors 14, 16 and 18. The cotton bales continue on and fall off on the removal assembly 20 and are discharged back onto the supporting surface in upright or on end for ease of handling in a usual manner.

Thus there is provided a machine for effectively tagging, weighing and sampling bales of cotton in which substantially all hand truckers are eliminated as far as these operations are concerned thus eliminating the necessity of having persons available with hand trucks for carrying the bales of cotton to a weighing platform and subsequently to a sampling station. With the machine of the present invention, a larger number of cotton bales may be tagged, weighed, and sampled in a given time with less employees or operators thereby facilitating the handling of cotton bales.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A cotton weighing machine comprising a plurality of longitudinally aligned conveyors including a loading conveyor, a tagging conveyor, a scale conveyor, a sampling conveyor and a removal assembly, said scale conveyor being mounted on the platform of a weighing scale for weighing a bale of cotton deposited on the scale conveyor, power means driving the tagging conveyor, scale conveyor and sample conveyor simultaneously, and means on said scale conveyor for stopping the tagging conveyor, scale conveyor and sampling conveyor when a bale of cotton is positioned on the scale conveyor thus enabling the weight of the bale of cotton to be recorded and to permit a preceding bale on the sampling conveyor to be sampled and a succeeding bale on the tagging conveyor to be tagged, said removal assembly including a horizontally disposed slide plate disposed below the discharge end of the sampling conveyor, a transverse movable bar mounted above said slide plate for engaging a bale of cotton and pushing the same off the slide plate in upright condition, means responsive to discharge of a bale of cotton from the horizontal position on the sampling conveyor to a vertical position on the slide plate to operate the pusher bar, and means for stopping the pusher bar in position for engaging a succeeding bale of cotton.

2. The combination of claim 1 wherein said loading conveyor includes an inclined ramp extending below the plane of the tagging conveyor for tilting the bales of cotton from the loading conveyor onto the tagging conveyor so that the bales of cotton may be deposited on the loading conveyor in upright condition and tilted onto the tagging conveyor in horizontal position, said inclined ramp having a stationary stop plate at the lower end thereof for assuring tilting of a bale from an inclined position on the ramp to a horizontal position on the tagging conveyor.

3. The combination of claim 2 wherein said ramp includes a plurality of freely rotatable rollers for gravity movement of the bales and is provided with a movable stop bar mounted in the path of movement of a bale of cotton down the ramp, said stop bar being connected to a switch controlling the operation of the loading conveyor and maintaining the loading conveyor inoperative as long as there is a bale of cotton on the inclined ramp.

4. A cotton weighing machine comprising a plurality of longitudinally aligned conveyors including a loading conveyor, a tagging conveyor, a scale conveyor, a sampling conveyor and a removal assembly, said scale conveyor being mounted on the platform of a weighing scale for weighing a bale of cotton deposited on the scale conveyor, power means driving the tagging conveyor, scale conveyor and sample conveyor simultaneously, and means on said scale conveyor for stopping the tagging conveyor, scale conveyor and sampling conveyor when a bale of cotton is positioned on the scale conveyor thus enabling the weight of the bale of cotton to be recorded and to permit a preceding bale on the sampling conveyor to be sampled and a succeeding bale on the tagging conveyor to be tagged, said means on the scale conveyor for stopping the tagging conveyor, scale conveyor, and sampling conveyor including a movable stop bar projecting into the path of movement of a bale of cotton moving onto the scale conveyor from the tagging conveyor thereby stopping the conveyors with a single bale of cotton on the scale conveyor for permitting weighing thereof, and manual means for operating the conveyors for moving the bale of cotton off the scale conveyor, said removal assembly including a horizontally disposed slide plate disposed below the discharge end of the sampling conveyor, a transverse movable bar mounted above said slide plate for engaging a bale of cotton and pushing the same off the slide plate in upright condition, means responsive to discharge of a bale of cotton from the horizontal position on the sampling conveyor to a vertical position on the slide plate to operate the pusher bar, and means for stopping the pusher bar in position for engaging a succeeding bale of cotton.

5. In a cotton weighing machine having a scale conveyor and sampling conveyor arranged in longitudinal horizontal alignment, a removal assembly disposed below the plane of the sampling conveyor and including a slide plate for receiving the end of a bale of cotton as it tilts off of the discharge end of the sampling conveyor, a pair of endless chain elements mounted on said slide plate generally along each side edge thereof, a transverse pusher rod interconnecting the endless chain and extending transversely of the slide plate in vertically spaced relation thereto, means for driving said chains for pushing a bale of cotton off the slide plate, said means including a control bar disposed in the path of movement of a bale of cotton as it moves from the sample conveyor onto the slide plate thereby energizing the driving means for the endless chains thus pushing the bale of cotton off the slide plate, and means disposed in the path of movement of the transverse rod for engagement thereby when the rod reaches an initial position thereby retaining the rod in position for engagement with a subsequent bale of cotton.

References Cited in the file of this patent

UNITED STATES PATENTS

| 1,352,329 | Tschache | Sept. 7, 1920 |
|---|---|---|
| 1,449,027 | Allen | Mar. 20, 1923 |
| 1,617,301 | Reddick | Feb. 8, 1927 |
| 1,671,774 | McIntosh | May 29, 1928 |
| 1,697,220 | Anstiss | Jan. 1, 1929 |
| 1,857,881 | Scott | May 10, 1932 |
| 1,977,307 | Hayssen | Oct. 16, 1934 |
| 2,279,041 | Hadley | Apr. 7, 1942 |
| 2,521,876 | Stake | Sept. 12, 1950 |

FOREIGN PATENTS

| 77,588 | Denmark | May 24, 1954 |
|---|---|---|
| 1,056,995 | France | Mar. 4, 1954 |